Sept. 22, 1931.  J. W. JACKSON  1,824,484
BRAKE CONSTRUCTION
Filed Feb. 3, 1930  2 Sheets-Sheet 1

INVENTOR:
JOSEPH W. JACKSON,
BY H.S. Woodward,
ATTORNEY.

Sept. 22, 1931.  J. W. JACKSON  1,824,484
BRAKE CONSTRUCTION
Filed Feb. 3, 1930  2 Sheets-Sheet 2
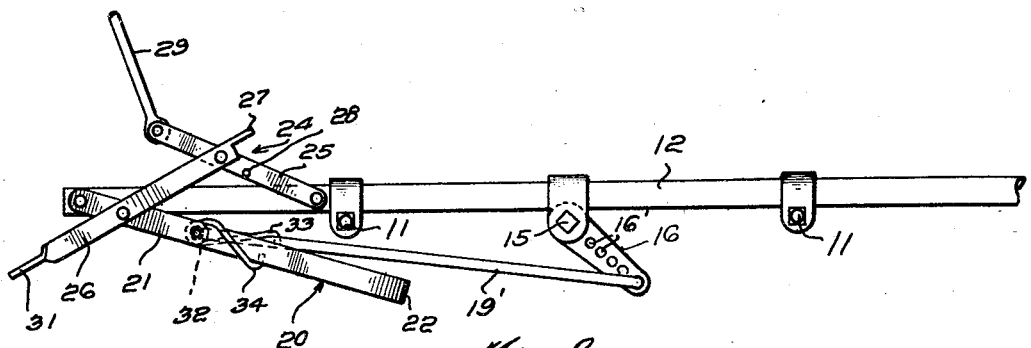
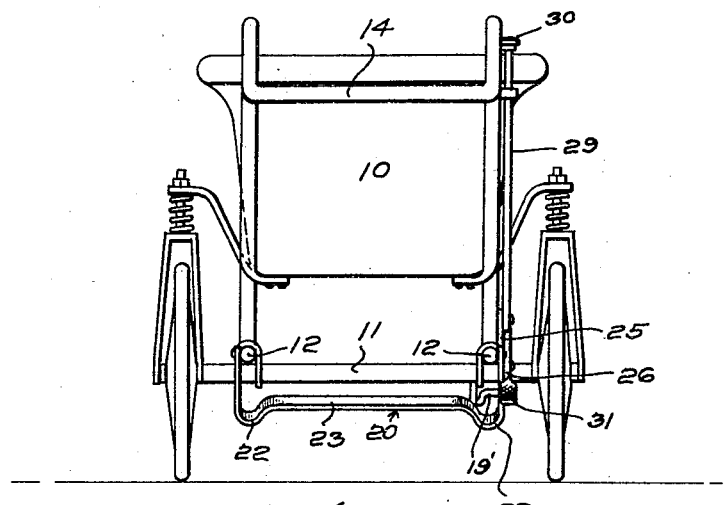
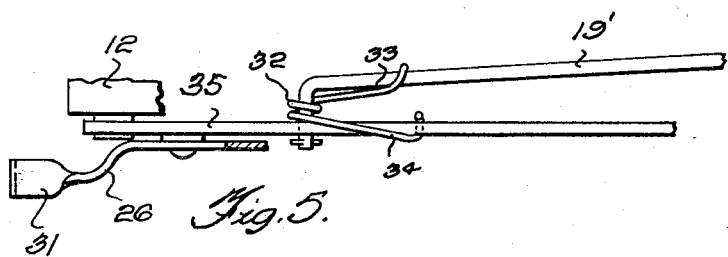
INVENTOR:
JOSEPH W. JACKSON,
BY *H. S. Woodward,*
ATTORNEY.

Patented Sept. 22, 1931

1,824,484

UNITED STATES PATENT OFFICE

JOSEPH W. JACKSON, OF BROOKLYN, NEW YORK, ASSIGNOR TO HARRY PERLMUTTER, OF BROOKLYN, NEW YORK

BRAKE CONSTRUCTION

Application filed February 3, 1930. Serial No. 425,635.

The invention relates to brake constructions, and particularly to a brake adapted to use in baby carriages, and having special value therein from the aspect of safety, efficiency, and durability. The invention has for an object to effect improvements in the form of the operative means and connections by which the brake is applied and released. It is a purpose to present an improved form of brake shoe. A further purpose is to offer an improvement in the releasing device. A still further aim is to simplify the connections necessary to attain the operation of a double brake and carriage-tilt release.

An important aim of the invention is to present a new form of release by which a tilting backward of the carriage may be utilized to effect release of the brake, to the end of minimizing the liability of casual release, and to so construct this form of release that it may also be foot operated without the provision of any additional pedal or other connections.

It is also a purpose to present a ground-engaging lever of novel structure.

Additional objects, advantages and features of invention reside in the arrangement, construction and combination of parts involved in the embodiment of the invention, as will be understood from the following description and accompanying drawings, in which Figure 1 is a side view of a carriage embodying my invention, Figure 2 is a plan view of a running gear with wheels and other non-essentials of the view omitted.

Figure 3 is a side view of the brake operating assembly.

Figure 4 is a rear view of the carriage with the brake applied position.

Figure 5 is a detail of a modification.

Figure 1:
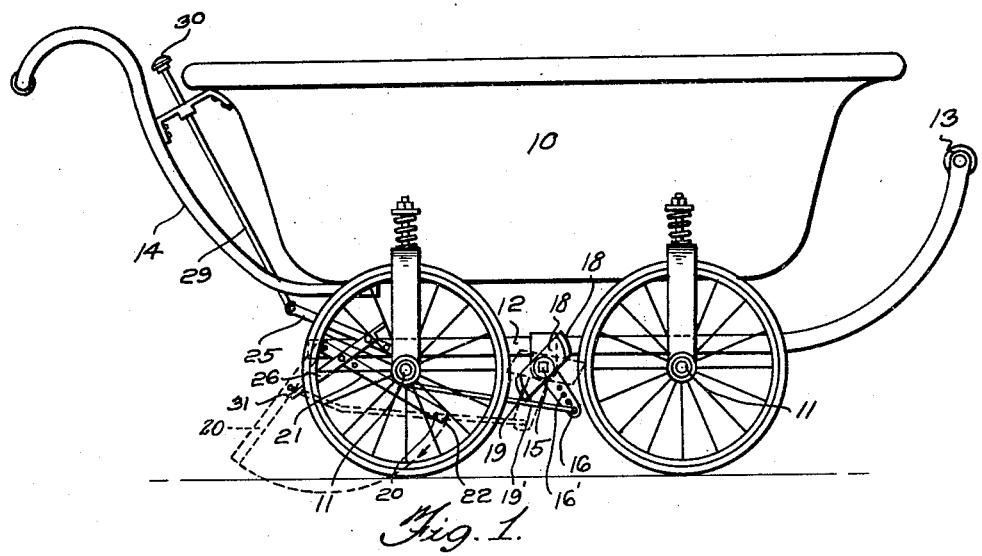
Figure 2:
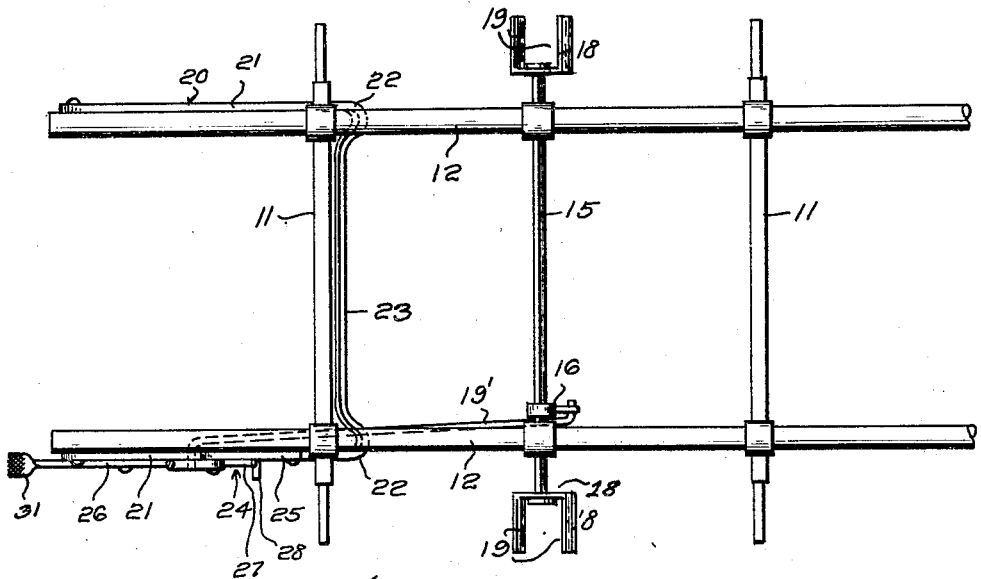

There is illustrated a carriage including a body 10, which may be supported by any approved spring suspension or otherwise on a running gear which may be one of many well known forms. The gear includes two axles 11 as shown, wheeled as customary. The axles are connected by longitudinal side frame members 12, which at their forward ends are curved upwardly to a level midway of the height of the body 10, and provided with a bumper device 13 suitably constructed to engage obstacles and cushion shocks of such engagement, as well as to prevent contact of the body with obstructions encountered.

In the present instance the members 12 project a short distance rearward of the rear axle 11 these projections being horizontal and stopping short of the rearmost peripheries of the wheels, although this is not arbitrary. The body 10 is provided with push handles 14 fixed rigidly thereon.

Midway of the length of the side members 12 a brake shaft 15 is revolubly mounted having near and inwardly of one of the side members a rigid arm 16 by which it may be rocked for application and release of the brake. Each end of the shaft 14 projects through a bearing on the respective side member 12, and on the extremity at each end there is fixed a U-shaped brake shoe 18. The shoe is formed of resilient broad strap metal. The bight of this U-shaped member is planiform and fixed rigidly on the end of the shaft. The arms 19 of the shoe are longitudinally rectilinear but transversely each arm is curved so that a convex face is presented outwardly, and the chords of this curve in the two arms are parallel and disposed at an oblique angle to the medial plane in which the arms lie. This obliquity is in a direction which places one edge of each arm on a shorter radius of the axis of rotation of the shoe than the opposite edge of the same arm. As a result in initial braking movement the shorter radius portions engage the rubber tire of the wheel lightly and the pressure increases with a cam action as the shoe continues to rotate. By forming the shoe of resilient material, in case of eccentricities in the wheels, or inequalities in the tire surfaces, a certain measure of equalizing action is attained by the slight flexure of the arms of the shoe as the maximum pressure is developed.

The arm 16 has a series of longitudinally spaced apertures 16' therein and has a link 19' connected thereto by having its forward end bent at right angles and inserted through one of the holes of the arm. The rear end of this link is connected pivotally to a ground-engaging lever or yoke 20, which is thus held in a position corresponding to that of the arm 16, that is, when the brake is released the yoke 20 is in disengaged position. The result is that the yoke 20 moves with the arm 16. The yoke 20 has two side arms 21 which are pivoted at their extremities on the rear ends of the side members 12 so that the yoke may swing easily when required. The bight or transverse portion 22 of the yoke extends inwardly from each arm 21, a short distance forming feet 22, and then its middle part 23 is offset upwardly and extended in any desired form above the level of the feet 22.

There is provided a toggle 24, one bar 25 of which is pivoted at its extremity on the side member 12 while the other bar 26 of the toggle is pivoted on the side arm 21 slightly above the point of connection of the link 19' with this arm. The bar 26 is formed with an extension 27 adjacent its connection with the other bar 25 of the toggle, acting as a stop by engagement with the pin 28 on the bar 25. This serves to stop braking movement of the toggle with its knuckle slightly beyond dead center after it is moved downwardly. Operation of the toggle is gained by a push rod 29 mounted loosely and slidably on the rear side of the body 10 and having an operating handle 30 close to the level of, and forwardly of the handle 14.

The bars of the toggle when drawn upwardly lift the yoke 20, as shown in Figure 3, and this, pushing the link 19' forwardly, releases the brake by pressing forwardly on the arm 16 and rotating the shoes 18 to inoperative position. Any desired yielding or releasable means may be provided to hold the brake in released position. It should be noted that the legs 21 of the yoke 20 are of a length to clear the ground when the toggle is in applied position, and preferably, they are then extended rearwardly of the vertical lower radius of the pivot of the yoke. In this position the bar may be readily pressed downwardly and forwardly by the foot to release the brake. In order to permit such movement, the toggle must be moved from its locked position beyond dead center, and to effect this the handle 30 may be operated, or a device as shown in Figure 5 or other means utilized. In Figure 5 the bar 26 carries a kick-release extension 31 at its rearward end, which is the end pivoted on the yoke 20.

When the parts are in applied position the extension 31 projects a distance rearwardly of the leg 21 of the yoke and is offset suitably to permit the foot of a person to be pressed thereon, when it is desired to release the brake. Such pressure will cause lifting of the knuckle above dead center, then by tilting the carriage upwardly at the front end the feet 22 will engage the ground, and drawing the carriage rearward slightly will then complete release movement of the brake.

A torsion spring 32 is provided, having helices engaged loosely around the outturned part of the brake rod 19', between the rod and the arm of the yoke 20 through which the rod end is inserted. Tangent arms 33 and 34 are formed at respective ends of the spring, one being engaged on top of the brake rod while the other engages the back side of the ground-engaging yoke, the spring being under tension tending to move the ground-engaging member forwardly and upwardly to inoperative position.

By the functioning of the spring 32, when the brake is moved to applied position, as soon as the toggle has moved past dead center, the spring will oppose movement of the toggle back toward dead center for release, yieldable however to operation of the rod 29 or pressure on the release arm 31.

The link 25 is also extended at its rear end, beyond the central pivot of the toggle, and the push rod 29 is connected to the extremity of this extension, so that it is made easy to operate the toggle when the brake pressure increases, as in the final stages of application movement, and the initial part of release movement.

If desired, instead of the ground-engaging member being extended across the carriage between the members 12, it may consist of a single straight bar corresponding to the right hand side of the yoke 20.

In the movement of the yoke 20 from released position to full engaged position the extremity 22 engages the ground after a short initial movement, and in this engagement forward progression of the carriage will then assist in the further brake-applying movement of the parts. While it is stated above that in releasing the brake the carriage is tilted upwardly at the front end, it is understood that the body may be so tilted without necessarily lifting the front wheels. The connections may be so made that the part 22 of the yoke 20 will remain in engagement with the ground while the brake is applied, and in such case, in order to insure proper friction of the parts 22 with the ground in order to assist in release of the brake, pressure downward may still be applied on the handles 14 lifting the front end of the body but intended only to insure sufficient friction between the part 22 and the ground. But if the link 19' is adjusted in openings 16' of longer radius, the part 22 of the yoke 20 may be clear of the ground in its rearmost position, and in that event a tilting of the frame and lifting of the front wheels would be involved in order to bring the yoke into engagement with the ground. The invention is capable of use in either way.

The combined use of the foot bar 23 and the rearward manual pull on the carriage, makes the device operable with extreme ease.

I claim:—

1. A brake device comprising two wheels in close spaced relation, a transverse rock shaft therebetween equally spaced from the wheels, opposite spaced eccentric yielding shoe members on the shaft having a radius to simultaneously engage the wheels.

2. A brake device comprising a frame member, a wheel brake including rock shaft on the frame, a link eccentrically connected thereto, a ground engaging member pivoted on the frame for fore and aft movement and having a radius to swing rearwardly into engagement with the ground in initial movement during brake applying operation and connected with the link for movement toward the ground simultaneously with braking movement of the shaft, and means to operate the brake.

3. The brake of claim 2 in which there is included a dead center device in the operating means movable for release by ground engagement of said ground engaging member.

4. The structure of claim 2 in which there is included yielding means to hold the brake applied, said ground-engaging member having a foot portion adapted to be engaged by the foot of an operator for release.

5. The structure of claim 2 in which the ground-engaging member has movement rearwardly to a rearwardly extending position under brake application action, and is provided with a foot-engaging portion for the purpose described.

6. The structure of claim 2 in which the ground-engaging member is a yoke having arms pivoted on said frame and a bight portion between the arms having an upwardly offset major part adapted for engagement of the foot of a person.

7. A brake apparatus comprising a frame, a wheel-engaging brake shoe and a ground-engaging member movable from operative position to an inoperative position, operative means for the brake including a dead center device connected operatively to the ground-engaging member for movement of the latter to operative position on application action of the apparatus, and for movement of the ground-engaging member to inoperative position on release action of the apparatus.

8. A brake apparatus comprising a frame, a brake shoe, operative connections for the shoe including a swinging ground-engaging member, a brake rod connected between the swinging member and brake shoe, said operating connection including also a dead center device.

9. The structure of claim 2 in which there is included a dead center device in the operating means, movable for release by ground engagement of said ground engaging member, and separate releasing means included in said operating means.

10. In a brake of the character described a frame, a brake shoe and operative connections therefor including a toggle device, an operating device connected with the toggle device, the outer end of one link of the toggle device extended beyond its outer pivot and formed as a release arm.

In testimony whereof I affix my signature.

JOSEPH W. JACKSON.